United States Patent
Kosugi et al.

(10) Patent No.: US 8,889,231 B2
(45) Date of Patent: Nov. 18, 2014

(54) POWDER COATING METHOD

(75) Inventors: Naofumi Kosugi, Kawasaki (JP); Yasushi Yui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 298 days.

(21) Appl. No.: 13/351,322

(22) Filed: Jan. 17, 2012

(65) Prior Publication Data

US 2012/0237775 A1 Sep. 20, 2012

(30) Foreign Application Priority Data

Mar. 18, 2011 (JP) ................. 2011-060165

(51) Int. Cl.
*B05D 1/06* (2006.01)
*B05D 1/04* (2006.01)
*C09D 5/03* (2006.01)

(52) U.S. Cl.
CPC .............. *B05D 1/06* (2013.01); *B05D 2202/00* (2013.01); *C09D 5/032* (2013.01)
USPC ............................. 427/475; 427/477; 427/485

(58) Field of Classification Search
USPC .......................................... 427/475, 477, 485
See application file for complete search history.

(56) References Cited

U.S. PATENT DOCUMENTS

| | | | |
|---|---|---|---|
| 3,978,153 A | 8/1976 | Sato et al. | |
| 4,054,681 A | 10/1977 | Brüning et al. | |
| 4,073,775 A | 2/1978 | Matsuo et al. | |
| 4,147,737 A * | 4/1979 | Sein et al. | 525/438 |
| 4,324,812 A * | 4/1982 | Bentley | 427/8 |
| 6,120,832 A * | 9/2000 | Walsh et al. | 427/8 |

FOREIGN PATENT DOCUMENTS

| | | |
|---|---|---|
| JP | 56-28675 A | 3/1981 |
| JP | 57-27159 A | 2/1982 |
| JP | 9-220514 A | 8/1997 |
| JP | 9-276791 A | 10/1997 |
| JP | 2003-049120 A | 2/2003 |
| JP | 2004-41901 A | 2/2004 |
| JP | 2008-179803 A | 8/2008 |

OTHER PUBLICATIONS

Dastoori et al., "Measurements of thickness and adhesive properties of electrostatic powder coatings for standard and modified powder coating guns," Journal of Electrostatics, vol. 51-52, May 1, 2001, pp. 545-551.

Dastoori et al., "Measurement of the electrostatic powder coating properties for corona and triboelectric coating guns," Journal of Electrostatics, vol. 63, No. 6-10, Mar. 19, 2005, pp. 545-550.

(Continued)

*Primary Examiner* — Frederick Parker
(74) *Attorney, Agent, or Firm* — Fujitsu Patent Center

(57) ABSTRACT

A coating film is formed on a surface of a coating object by adhering a coating powder to the coating object by spraying the coating powder from an electrostatic gun together with a compressed gas. A voltage not smaller than 80 kV but not larger than 100 kV is applied between the electrostatic gun and the coating object. Moreover, a current flowed between the electrostatic gun and the coating object is set to be not smaller than 10 μA but not larger than 20 μA. Further, a pressure of the compressed gas for spraying the coating powder is set to be not smaller than 3 kgf/cm$^2$ but not larger than 6 kgf/cm$^2$.

4 Claims, 6 Drawing Sheets

(56) References Cited

OTHER PUBLICATIONS

Extended European Search Report dated Mar. 19, 2012 for corresponding European Application No. 12152072.0.

Japanese Office Action mailed Feb. 25, 2014, for corresponding Japanese Application No. 2011-60165, 15 pages.

Yuji Harasaki, "Coating method," Published by Maki Bookstore on Jun. 30, 1983, first edition, pp. 154-171, see JPOA filed herewith.

* cited by examiner

FIG. 5

| Coating Conditions (Voltage/Current/Pressure) | Appearance | Judgment | Film-Thickness(One Coat) And Good Product Ratio |
|---|---|---|---|
| 50kV,10μA,1-3kgf/cm² | occurrence of lack of hiding | poor | 30μm or less |
| 50kV,10μA,3-6kgf/cm² | occurrence of lack of hiding | poor | 30μm or less |
| 50kV,10μA,6kgf/cm² | occurrence of moderate lack of hiding | moderately poor | 30 to 40μm (good product ratio is 20% or less) |
| 50kV,10μA,6-8kgf/cm² | occurrence of moderate lack of hiding | moderately poor | 30 to 40μm (good product ratio is 20% or less) |
| 50kV,20μA,1-3kgf/cm² | occurrence of lack of hiding | poor | 30μm or less |
| 50kV,20μA,3-6kgf/cm² | occurrence of lack of hiding | poor | 30μm or less |
| 50kV,20μA,6kgf/cm² | occurrence of moderate lack of hiding | moderately poor | 30 to 40μm (good product ratio is 20% or less) |
| 50kV,20μA,6-8kgf/cm² | occurrence of moderate lack of hiding | moderately poor | 30 to 40μm (good product ratio is 20% or less) |
| 50kV,30μA,1-3kgf/cm² | occurrence of moderate lack of hiding | moderately poor | 30 to 40μm (good product ratio is 20% or less) |
| 50kV,30μA,3-6kgf/cm² | occurrence of moderate lack of hiding | moderately poor | 30 to 40μm (good product ratio is 20% or less) |
| 50kV,30μA,6kgf/cm² | occurrence of moderate lack of hiding | moderately poor | 30 to 40μm (good product ratio is 20% or less) |
| 50kV,30μA,6-8kgf/cm² | occurrence of moderate lack of hiding | moderately poor | 30 to 40μm (good product ratio is 20% or less) |
| 100kV,10μA,1-3kgf/cm² | occurrence of lack of hiding | poor | 30μm or less |
| 100kV,10μA,3-6kgf/cm² | occurrence of lack of hiding | poor | 30μm or less |
| 100kV,10μA,6kgf/cm² | occurrence of moderate lack of hiding | moderately poor | 30 to 40μm (good product ratio is 20% or less) |
| 100kV,10μA,6-8kgf/cm² | occurrence of moderate lack of hiding | moderately poor | 30 to 40μm (good product ratio is 20% or less) |
| 100kV,20μA,1-3kgf/cm² | occurrence of moderate lack of hiding | moderately poor | 30 to 40μm (good product ratio is 20% or less) |
| 100kV,20μA,3-6kgf/cm² | good | good | 40 to 50μm (good product ratio is 60% or more) |
| 100kV,20μA,6kgf/cm² | good or optimum condition | optimum condition | 40 to 70μm (good product ratio is 80% or more) |
| 100kV,20μA,6-8kgf/cm² | occurrence of moderate orange peel | moderately poor | 60 to 80μm (good product ratio is 20% or less) |
| 100kV,30μA,1-3kgf/cm² | occurrence of moderate orange peel | moderately poor | 60 to 80μm (good product ratio is 20% or less) |
| 100kV,30μA,3-6kgf/cm² | occurrence of orange peel | poor | 80μm or more |
| 100kV,30μA,6kgf/cm² | occurrence of orange peel | poor | 80μm or more |
| 100kV,30μA,6-8kgf/cm² | occurrence of orange peel | poor | 80μm or more |
| 80kV,10μA,1-3kgf/cm² | occurrence of moderate lack of hiding | moderately poor | 30 to 40μm (good product ratio is 20% or more) |
| 80kV,10μA,3-6kgf/cm² | good | good | 40 to 50μm (good product ratio is 60% or more) |
| 80kV,10μA,6kgf/cm² | good | good | 40 to 50μm (good product ratio is 60% or more) |
| 80kV,10μA,6-8kgf/cm² | occurrence of moderate orange peel | moderately poor | 60 to 80μm (good product ratio is 20% or less) |
| 80kV,20μA,1-3kgf/cm² | occurrence of moderate lack of hiding | moderately poor | 30 to 40μm (good product ratio is 20% or less) |
| 80kV,20μA,3-6kgf/cm² | occurrence of moderate orange peel | moderately poor | 60 to 80μm (good product ratio is 20% or less) |
| 80kV,20μA,6kgf/cm² | occurrence of moderate orange peel | moderately poor | 60 to 80μm (good product ratio is 20% or less) |
| 80kV,20μA,6-8kgf/cm² | occurrence of moderate orange peel | moderately poor | 60 to 80μm (good product ratio is 20% or less) |
| 80kV,30μA,1-3kgf/cm² | occurrence of moderate orange peel | moderately poor | 60 to 80μm (good product ratio is 20% or less) |
| 80kV,30μA,3-6kgf/cm² | occurrence of moderate orange peel | moderately poor | 60 to 80μm (good product ratio is 20% or less) |
| 80kV,30μA,6kgf/cm² | occurrence of orange peel | poor | 80μm or more |
| 80kV,30μA,6-8kgf/cm² | occurrence of orange peel | poor | 80μm or more |

FIG. 7

| Evaluation Item | Powder Coating | Solvent Coating |
|---|---|---|
| 1. color name | off-black | off-black |
| 2. film thickness | 40 μm (one coat) | 40 μm (two coats) |
| 3. appearance | good | good |
| 4. crosscut | 100/100 | 100/100 |
| 5. tape peel | no peel-off | no peel-off |
| 6. temperature and humidity cycle test MIL-STD-202G-106G | 10 cycles (clear) ☆1 cycle =1 day | 10 cycles (clear) ☆1 cycle = 1 day |
| 7. IPA wipe test (10 times) | no loss of color and exposure of base metal | no loss of color and exposure of base metal |
| 8. pencil hardness (H or higher) | 3H to 4H | H to 2H |
| overall evaluation | pass (all items are clear) | pass (all items are clear) |

POWDER COATING METHOD

CROSS-REFERENCE TO RELATED APPLICATION

This application is based upon and claims and the benefit of priority of the prior Japanese Patent Application No. 2011-060165, filed on Mar. 18, 2011, the entire contents of which are incorporated herein by reference.

FIELD

The embodiment discussed herein is related to a powder coating method.

BACKGROUND

The chassis of electronic devices such as personal computers and servers are made of metal or plastic. In recent years, due to increased awareness of environmental load and ecology, the development of so-called green products, which are low in environmental load and therefore ecological, have been drawing attention.

For this reason, metallic materials, which are easier to recycle than plastics, have been used for the chassis of electronic devices. As for the metals used for the chassis of electronic devices, iron, steel, stainless steel, aluminum, magnesium, and the like are available, for example. Among them, galvanized steel sheets obtained by galvanizing an iron surface have been used widely.

In a case of using metal for the chassis of electronic devices, coating is usually applied to the metal to prevent rust and improve the quality of appearance (visual appeal) and durability. Currently, organic coating using organic solvents are predominating the coating of the chassis of electronic devices.

However, the organic solvents contain volatile organic compounds (hereinafter, referred to as "VOCs"), which are a cause of air pollution. The organic solvents may be vaporized and released to the atmosphere during the coating. Moreover, during bake drying, the organic solvents may be decomposed into carbon dioxide and water, and the carbon dioxide, which is regarded as a cause of the global warming, may be released to the environment.

Powder coating has been known as a coating method using no organic solvent. In powder coating, a voltage is applied between an electrostatic gun configured to spray a coating powder and a coating object, and the electrically charged powder is adhered to the coating object. Then, the coating object is subjected to a heat treatment (bake drying) at a predetermined temperature to planarize the surface of the coating film.

Patent Document 1: Japanese Laid-open Patent Publication No. 2008-179803

Patent Document 2: Japanese Laid-open Patent Publication No. 2003-49120

Patent Document 3: Japanese Laid-open Patent Publication No. 09-276791

SUMMARY

According to an one aspect of the disclosed technique, there is provided a powder coating method including: adhering a coating powder to a coating object by spraying the coating powder from an electrostatic gun together with a compressed gas, wherein, in the adhering the coating powder to the coating object, the coating powder is sprayed from the electrostatic gun under conditions that a voltage applied between the electrostatic gun and the coating object is set to be not smaller than 80 kV but not larger than 100 kV, a current flowed between the electrostatic gun and the coating object is set to be not smaller than 10 µA but not larger than 20 µA, and a pressure of the compressed gas for spraying the coating powder is set to be not smaller than 3 kgf/cm$^2$ but not larger than 6 kgf/cm$^2$.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a table organizing and listing coating conditions, appearance after coating, quality judgment, film-thickness measurement result, and good product ratio;

FIG. 7 indicates results of comparisons between powder coating and solvent coating performed under their respective optimum conditions.

DESCRIPTION OF EMBODIMENT

Before describing embodiment, a prelude will be described below to facilitate understanding of the embodiments.

As mentioned earlier, solvent coating has a disadvantage that it involves the releasing of VOCs and carbon dioxide to the environment. However, solvent coating has an advantage that it may provide a fine surface relatively easily through double coating including undercoating (primer coating) and topcoating.

Figure 1:
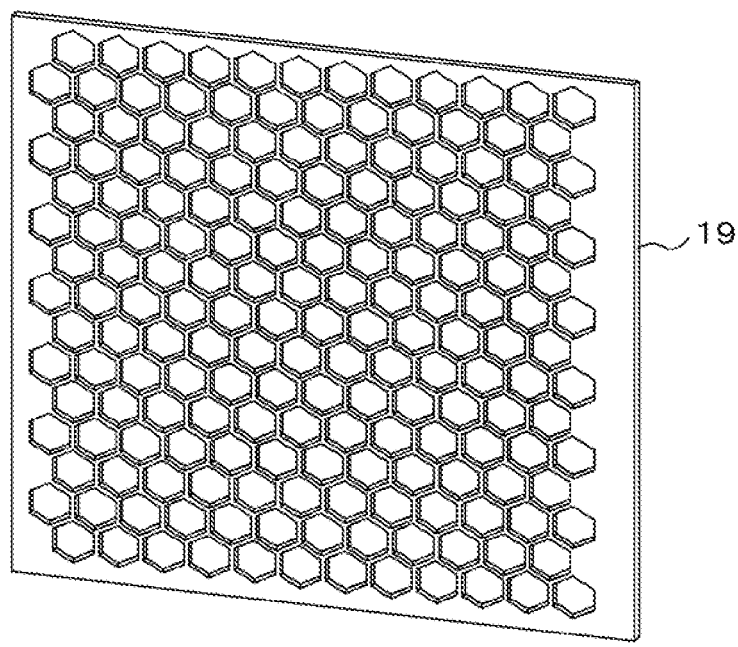
FIG. 1 is a diagram illustrating an example chassis provided with honeycomb holes.

In contrast, powder coating has an advantage that it does not involve the releasing of substances large in environmental load such as VOCs and carbon dioxide and that a thick coating film may be formed through a single coating process. However, it is difficult to obtain a fine surface like solvent coating does. For example, in a case of performing powder coating on a chassis 19 provided with honeycomb holes as illustrated in FIG. 1, the thickness of the coating film is likely to be uneven in certain areas, changing the hexagonal holes into roundish holes.

Moreover, even in a case of coating a flat and smooth surface, if the thickness of the coating film is large, small asperities are generated on the surface thereof, causing a condition called "orange peel". Reducing the thickness of the coating film to prevent orange peel, however, makes the metal surface visible through it. This condition is called "lack of hiding".

In the following embodiment, a powder coating method will be described which may provide a fine surface having a substantially uniform coating thickness with no orange peel or lack of hiding even when the surface of a coating object has asperities or holes.

Embodiment

Figure 2:
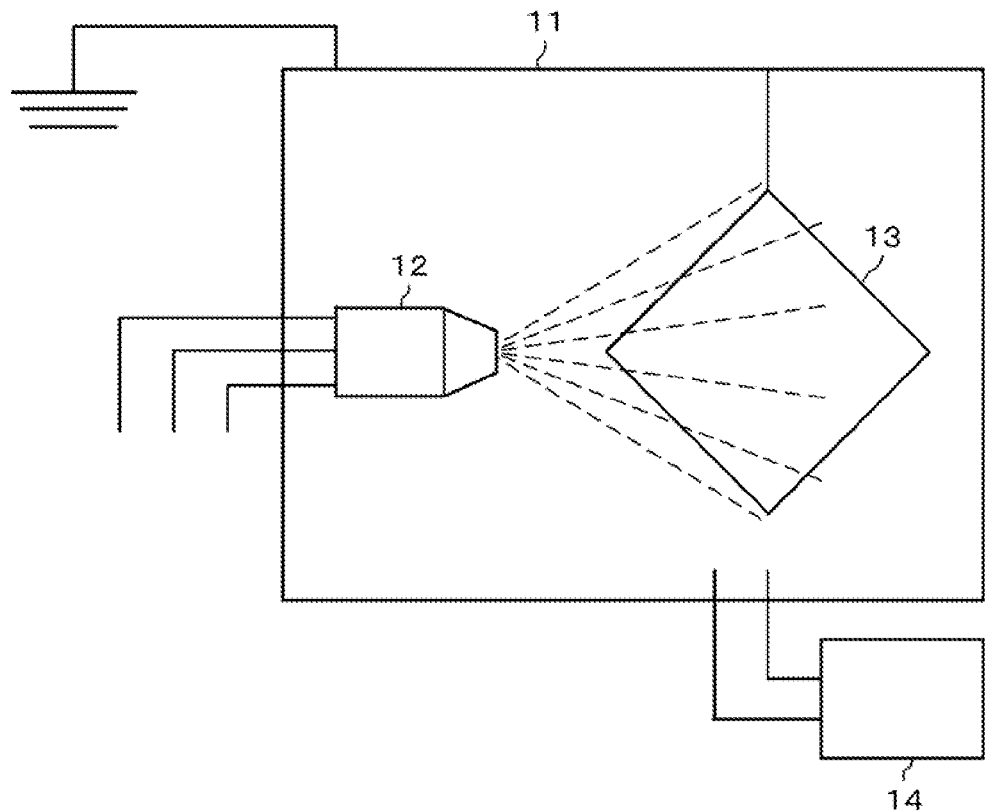
FIG. 2 is a schematic diagram (Part 1) for describing a powder coating method according to an embodiment.
Figure 3:
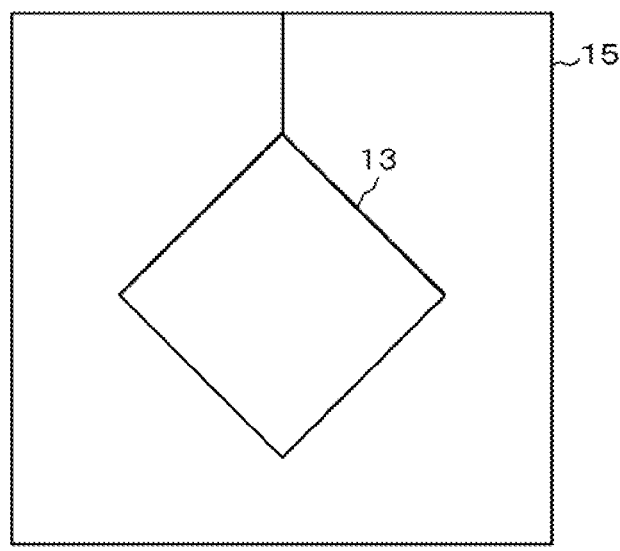
FIG. 3 is a schematic diagram (Part 2) for describing the powder coating method according to the embodiment.
Figure 4A:
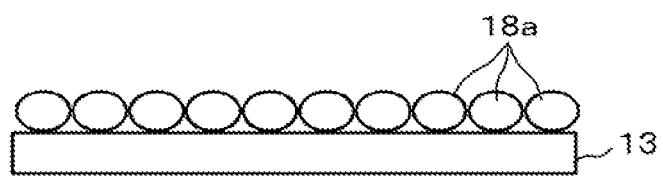
FIGS. 4A and 4B are schematic diagrams for describing surface conditions of a coating object.
Figure 4B:
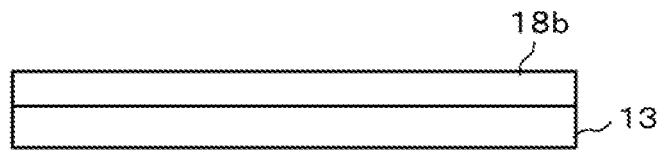

FIGS. 2 and 3 are schematic diagrams for describing a powder coating method according to an embodiment. In addition, FIGS. 4A and 4B are schematic diagrams for describing surface conditions of a coating object.

First, as illustrated in FIG. 2, a coating object 13 is placed inside a coating chamber 11. Then, with a predetermined voltage being applied between an electrostatic gun 12 and the coating object 13, the electrostatic gun 12 sprays a coating powder onto the coating object 13 together with compressed air. As a result, as illustrated in FIG. 4A, a coating powder 18a adheres to the surface of the coating object 13.

Note that reference numeral 14 in FIG. 2 schematically shows a coating powder recovery device. Moreover, the compressed air is an example compressed gas, and a different gas may be used instead of air.

As the coating powder, a dispersion element may be used which mainly contains an ethylene polymer, an epoxy resin, and an acrylic resin and is obtained by adding a pigment, a curative, an additive, a filler, and the like thereto and uniformly heating and kneading them. A coating powder made of other materials may be used instead.

In this embodiment, an electronic device chassis formed of a galvanized steel sheet is assumed as the coating object 13. However, the material of the coating object 13 is not limited to a galvanized steel sheet and may be any material as long as at least its surface is a metal such as iron, steel, stainless steel, aluminum, or magnesium. The coating object 13 may be an object other than an electronic device chassis.

The voltage applied between the electrostatic gun 12 and the coating object 13 is related to the uniformity in the application of the coating powder.

In a case where the voltage between the electrostatic gun 12 and the coating object 13 is below 80 kV, it is difficult for the coating powder to adhere thickly (e.g., 40 µm to 70 µm) and uniformly to the surface of the coating object 13, and therefore uneven coating and lack of hiding are likely to occur. On the other hand, in a case where the voltage between the electrostatic gun 12 and the coating object 13 exceeds 100 kV, orange peel is likely to occur. For this reason, in the powder coating method according to this embodiment, the voltage applied between the electrostatic gun 12 and the coating object 13 is set to be not smaller than 80 kV but not larger than 100 kV.

In a case where the current flowed between the electrostatic gun 12 and the coating object 13 is below 10 µA, it is difficult for the coating powder to adhere thickly and uniformly to the surface of the coating object 13, and therefore uneven coating and lack of hiding are likely to occur. On the other hand, in a case where the current flowed between the electrostatic gun 12 and the coating object 13 exceeds 20 µA, orange peel is likely to occur. For this reason, in this embodiment, the current flowed between the electrostatic gun 12 and the coating object 13 is set to be not smaller than 10 µA but not larger than 20 µA.

In a case where the pressure of the compressed air for spraying the coating powder is below 3 kgf/cm$^2$, it is difficult for the coating powder to adhere thickly and uniformly to the surface of the coating object 13, and therefore lack of hiding and exposure of base metal are likely to occur. Moreover, in a case where the pressure of the compressed air for spraying the coating powder exceeds 6 kgf/cm$^2$, generation of asperities and orange peel are likely to occur on the surface of the coating film. For this reason, in this embodiment, the pressure of the compressed air for spraying the coating powder is set to be not smaller than 3 kgf/cm$^2$ but not larger than 6 kgf/cm$^2$.

After the coating powder is adhered to the coating object 13 under the conditions mentioned above, the coating object 13 is moved to the inside of a heating furnace 15 and subjected to a heat treatment (bake drying) as illustrated in FIG. 3. By this heat treatment, the coating powder melts and the coated surface (coating film 18b) becomes flat as illustrated in FIG. 4B, whereby a fine surface condition is achieved.

In a case where the temperature during the heat treatment is below 180° C., the coating powder does not melt sufficiently, and therefore uneven brightness is likely to occur on the coating film. Moreover, insufficient drying may occur, and loss of color may occur in a wipe test using isopropyl alcohol (IPA).

Coating powders generally used in powder coating are higher in heat resistance than resins used in solvent coating. However, in a case where the temperature during the heat treatment exceeds 220° C., a phenomenon called discoloration meaning change in the color of the coating film is likely to occur. Moreover, a crack may be generated in the coating film in some cases. For this reason, in this embodiment, the temperature during the heat treatment is set to be not smaller than 180° C. but not larger than 220° C.

In this embodiment, as mentioned above, the voltage applied between the electrostatic gun 12 and the coating object 13 during the powder coating, the current during the powder coating, the pressure of the compressed air, and the temperature during the heat treatment are limited within their respective predetermined ranges. Thus, the thickness of the coating film may be made substantially uniform regardless of the surface condition (presence or absence of asperities or holes) of the coating object 13. Accordingly, a fine surface may be obtained. Moreover, the occurrence of orange peel and lack of hiding may be prevented.

In a case where the thickness of the coating film is below 40 µm, lack of hiding occurs. Moreover, in a case where the thickness of the coating film formed in a single coating process exceeds 70 µm, orange peel is likely to occur. For this reason, the thickness of the coating film formed by the method mentioned above is not smaller than 40 µm but not larger than 70 µm, preferably.

Description will be given below of results of research on the surface conditions of coating films obtained by actually performing powder coating under various conditions.

Note that as the coating powder, one made of a resin mixture of an epoxy resin and a polyester resin is used. Moreover, the voltage applied between the electrostatic gun and the coating object is adjusted within a range of 50 kV to 100 kV, and the current flowed between the electrostatic gun and the coating object is adjusted within a range from 10 µA to 30 µA. Further, the pressure of the compressed air during the powder coating is adjusted within a range from 1 kgf/cm$^2$ to 8 kgf/cm$^2$. Furthermore, the temperature during the heat treatment (bake drying) is set at 185±5° C., and the duration of the heat treatment is set to 20 minutes to 30 minutes.

FIG. 5 is a table organizing and listing coating condition, appearance after coating, quality judgment, film-thickness measurement result, and good product ratio. Note that in FIG. 5, "3-6 kgf/cm$^2$" means that the range includes 3 kgf/cm$^2$ but does not include 6 kgf/cm$^2$. Moreover, "1-3 kgf/cm$^2$" and "6-8 kgf/cm$^2$" mean that the ranges do not include 3 kgf/cm$^2$ and 6 kgf/cm$^2$, respectively.

As seen from FIG. 5, in cases where the voltage applied between the electrostatic gun and the coating object is 50 kV, lack of hiding is likely to occur. These cases are each judged as "poor" or "moderately poor". Note that the judgment indicating "poor" means that the ratio of good products included is 20% or below.

In cases where the voltage applied between the electrostatic gun and the coating object is 100 kV, the current is 20 μA, and the pressure is not smaller than 3 kgf/cm² but not larger than 6 kgf/cm², the thickness of the coating film is 40 μm to 70 μm, and surface defects such as lack of hiding and orange peel hardly occur. Moreover, the good product ratio is 60% or above. Hence, these cases are judged as "good".

Particularly in cases where the voltage applied between the electrostatic gun and the coating object is 100 kV, the current is 20 μA, and the pressure of the compressed air is 6 kgf/cm², the surface conditions of coating films are good. Moreover, the good product ratio is 80% or above. Hence, this case is judged as "optimum condition".

In cases where the voltage applied between the electrostatic gun and the coating object is 100 kV but the current is 10 μA and the pressure of the compressed air is below 3 kgf/cm², lack of hiding is likely to occur. Hence, these cases are judged as "poor" or "moderately poor".

Additionally, in cases where the voltage is 100 kV but the current is 30 μA and the pressure of the compressed air exceeds 6 kgf/cm², orange peel is likely to occur. Hence, these cases are judged as "poor" or "moderately poor".

In cases where the voltage applied between the electrostatic gun and the coating object is 80 kV, the current is 10 μA, and the pressure is not smaller than 3 kgf/cm² but not larger than 6 kgf/cm², the thickness of the coating film is 40 μm to 50 μm, and surface defects such as lack of hiding and orange peel hardly occur. Moreover, the good product ratio is 60% or above. Hence, these cases are judged as "good".

In cases where the voltage applied between the electrostatic gun and the coating object is 80 kV but the pressure of the compressed air is below 3 kgf/cm², lack of hiding is likely to occur. In addition, in cases where the voltage applied between the electrostatic gun and the coating object is 80 kV but the current is 30 μA and the pressure of the compressed air exceeds 6 kgf/cm², orange peel is likely to occur. Hence, these cases are judged as "poor" or "moderately poor".

Note that for those conditions in which the thickness of the coating film is small, causing lack of hiding, the powder coating may be repeated to increase the thickness of the coating film to 40 μm to 100 μm. In this way, it may be possible to avoid the lack of hiding and also obtain gloss on the surface. Accordingly, the products may be changed into good products.

Figure 6:
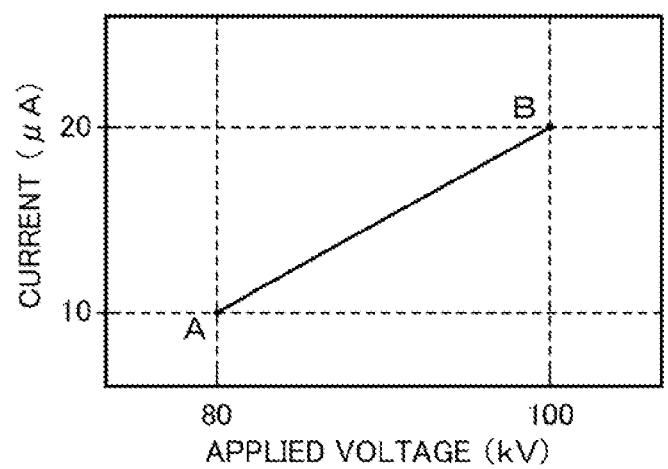
FIG. 6 is a graph taking applied voltage on its horizontal axis and current on its vertical axis, and illustrating the relationship between the current and voltage in a case where the coating is judged as good.

FIG. 6 is a graph taking applied voltage on its horizontal axis and current on its vertical axis, and illustrating the relationship between the current and voltage in a case where the coating is judged as "good" or "optimum condition". Here is illustrated a line connecting points A and B, where A is a point having 80 kV on the horizontal axis and 10 μA on the vertical axis and B is a point having 100 kV on the horizontal axis and 20 μA on the vertical axis. Good results may be expected by setting the pressure of the compressed air to 3 kfg/cm² to 6 kfg/cm² and making the applied voltage and current satisfy the conditions on the A-B line illustrated in FIG. 6.

Next, let us compare evaluation results of a coating film using powder coating under the conditions judged as "optimum condition" and evaluation results of a coating film using solvent coating under its optimum condition. FIG. 7 indicates results of comparisons between powder coating and solvent coating performed under their respective optimum conditions. Note that the color of the coating is off-black for both of the powder coating and solvent coating.

The target film thickness of the coating film is set to 40 μm. In this case, the powder coating may achieve the desired thickness by a single coating process (one coat). On the other hand, the solvent coating may achieve the desired thickness by two coating processes (two coats) including undercoating and topcoating.

The appearance of the coating film is good for both cases of the powder coating and the solvent coating.

In a tape peel test, 100 scratches are provided on each coating film lengthwise and widthwise at a pitch of 1.5 mm (crosscut). Then, an adhesive tape is attached to the surface of the coating film and then peeled off to check whether peel-off occurs in the coating film. The result is such that the powder coating and solvent coating both have no peel-off, and are judged as "good".

A temperature and humidity cycle test is performed by a method based on MIL-STD-202G-106G. Withstanding 10 cycles (1 cycle=1 day) is judged as "good." The result is such that the powder coating and the solvent coating are both judged as "good".

In an isopropyl alcohol (IPA) wipe test, the wiping is performed 10 times. The result is such that the powder coating and the solvent coating both have no loss of color or exposure of base metal, and are judged as "good".

In a pencil hardness test, a pencil scratch tester is used to measure the hardness of each coating film. A coating film hardness of H or higher in terms of pencil hardness is judged as "good." The coating film hardness in the case of the solvent coating is H to 2H, and the coating film hardness in the case of the powder coating is H to 4H, and therefore the judgment is "good" for both cases.

In the tests mentioned above, all the judgments are "good" for both of the powder coating and the solvent coating performed under their respective optimum conditions. As a result, it is found that the powder coating method according to this embodiment may provide a coating film equivalent to that of solvent coating.

Under the optimum condition, the powder coating and the solvent coating may be each capable of forming a good coating film. It is noted, however, that the powder coating may require one-coat coating whereas the solvent coating may require two-coat coating. In other words, the number of coating processes in the powder coating is smaller than the number of coating processes in the solvent coating. Accordingly, the powder coating may reduce the coating cost. Meanwhile, the level of the cost reduction depends on the product size of the coating target as well.

Moreover, the powder coating may not need to use any organic solvent. In contrast, use of an organic solvent may be essential in the solvent coating. For this reason, the powder coating is more environmentally friendly. In particular, since the solvent coating may require the coating of two or more coats, the amount of the organic solvent to be used increases in proportion to the number of coating processes. Moreover, during the solvent coating, operations such as the recovery of the used organic solvent may be necessary, and these operations may need to be performed for every single coating process. Accordingly, in the case of the solvent coating, it may be necessary to consider the costs required for these operations as well.

Note that although the thickness of the coating film in a single coating process is set within a range from 30 μm to 70 μm in the above embodiment, the thickness of the coating film may be 70 μm or larger by repeating the coating process a plurality of times.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A powder coating method comprising:
    adhering a polymeric coating powder to a coating object whose surface is a metal by spraying the coating powder from an electrostatic gun together with a compressed gas,
    wherein, in the adhering the coating powder to the coating object, the coating powder is sprayed from the electrostatic gun under conditions that a voltage applied between the electrostatic gun and the coating object is set to be not smaller than 80 kV but not larger than 100 kV and is fixed, a current flowed between the electrostatic gun and the coating object is set to be not smaller than 10 µA but not larger than 20 µA and is fixed, and a pressure for spraying the coating powder from the electrostatic gun is set to be not smaller than 3 kgf/cm$^2$ but not larger than 6 kgf/cm$^2$.

2. The powder coating method according to claim 1, further comprising:
    forming a coating film on a surface of the coating object by subjecting the coating object with the coating powder adhered thereto to a heat treatment,
    wherein, in the forming the coating film on the surface of the coating object, the coating object is subjected to the heat treatment at a temperature not lower than 180° C. but not higher than 220° C.

3. The powder coating method according to claim 1, wherein, in the adhering the coating powder to the coating object, in a graph taking applied voltage on a horizontal axis and current on a vertical axis, the voltage applied between the electrostatic gun and the coating object and the current flowed between the electrostatic gun and the coating object are set to satisfy conditions on a line segment connecting a point having 80 kV on the horizontal axis and 10 µA on the vertical axis and a point having 100 kV on the horizontal axis and 20 µA on the vertical axis.

4. The powder coating method according to claim 1, wherein a thickness of the coating film is not smaller than 40 µm but not larger than 70 µm.

* * * * *